(12) United States Patent
Terzi et al.

(10) Patent No.: US 12,145,337 B2
(45) Date of Patent: Nov. 19, 2024

(54) METHOD FOR TINTING OR DECOLORING A LENS, LENS OBTAINABLE BY THE METHOD FOR TINTING OR DECOLORING A LENS, LENS COMPRISING A TINT OR DECOLORIZATION, LENS HOLDER AND TINTING DEVICE FOR TINTING A LENS

(71) Applicants: Carl Zeiss Vision International GmbH, Aalen (DE); Carl Zeiss Vision Sunlens China Ltd., Guangdong (CN)

(72) Inventors: Davide Terzi, Milan (IT); John Feng, Guangdong (CN); Brolin Li, Guangzhou (CN)

(73) Assignees: Carl Zeiss Vision International GmbH, Aalen (DE); Carl Zeiss Vision Sunlens China Ltd., Guangdong (CN)

( * ) Notice: Subject to any disclaimer, the term of this patent is extended or adjusted under 35 U.S.C. 154(b) by 0 days.

(21) Appl. No.: 18/477,211

(22) Filed: Sep. 28, 2023

(65) Prior Publication Data
US 2024/0017507 A1  Jan. 18, 2024

Related U.S. Application Data

(63) Continuation of application No. PCT/EP2022/058686, filed on Mar. 31, 2022.

(30) Foreign Application Priority Data

Mar. 31, 2021 (WO) ............... PCT/CN2021/084270

(51) Int. Cl.
*B29D 11/00* (2006.01)

(52) U.S. Cl.
CPC .. *B29D 11/00913* (2013.01); *B29D 11/00432* (2013.01)

(58) Field of Classification Search
CPC ................... B29D 11/00913; B29D 11/00432
See application file for complete search history.

(56) References Cited

U.S. PATENT DOCUMENTS

| 3,993,435 A | 11/1976 | Korver |
| 4,915,986 A | 4/1990 | Elias et al. |

(Continued)

FOREIGN PATENT DOCUMENTS

| CN | 102858521 A | 1/2013 |
| DE | 1697487 U | 4/1955 |

(Continued)

OTHER PUBLICATIONS

International Search Report issued in PCT/CN2021/084260, to which this application claims priority, dated Jan. 5, 2022.

(Continued)

*Primary Examiner* — Mathieu D Vargot
(74) *Attorney, Agent, or Firm* — Tautz & Schuhmacher LLC; Georg Hasselmann

(57) ABSTRACT

Methods for tinting or decoloring a lens include inserting a lens into a reception unit of a lens holder, providing an immersion bath containing a fluid, immersing the lens holder into the fluid; and rotating the lens holder around a rotation axis to a predetermined maximum rotation angle, wherein the rotation axis is located outside the lens and generally perpendicular to a plane of the lens. A lens obtainable by such methods, a lens having a tint or a decolorization, a lens holder, and a tinting device allowing for more complex (gradient) tints are also disclosed. The present disclosure further relates to a corresponding computer program.

33 Claims, 10 Drawing Sheets

(56) References Cited

U.S. PATENT DOCUMENTS

| | | |
|---|---|---|
| 5,201,955 A | 4/1993 | Chika et al. |
| 2011/0107965 A1 | 5/2011 | Wertheim et al. |
| 2016/0313574 A1 | 10/2016 | Takedomi et al. |
| 2020/0255327 A1 | 8/2020 | Dejneka et al. |

FOREIGN PATENT DOCUMENTS

| | | | | |
|---|---|---|---|---|
| DE | 19526928 A1 | * | 1/1997 | ....... B29D 11/00355 |
| EP | 0013867 A1 | | 8/1980 | |
| EP | 2018954 A2 | | 1/2009 | |
| GB | 2208322 A1 | | 3/1989 | |
| IT | 7949717 | | 7/1979 | |
| JP | 60101517 A | | 6/1985 | |
| JP | S63118122 A | | 5/1988 | |
| JP | S6478202 A | | 3/1989 | |
| JP | 06175082 A | | 6/1994 | |
| JP | 2004004503 A | | 1/2004 | |
| WO | 2009152381 A1 | | 12/2009 | |
| WO | 2011123132 A1 | | 10/2011 | |
| WO | 2015072336 A1 | | 5/2015 | |

OTHER PUBLICATIONS

International Search Report issued in PCT/EP2022/058686, to which this application claims priority, dated Aug. 17, 2022.

International Preliminary Report on Patentability issued in PCT/EP2022/058686, to which this application claims priority, dated Aug. 11, 2023.

Office Action by the Japanese Patent Office (JPO) issued in JP 2023-561036, which is a counterpart hereof, mailed on Mar. 5, 2024, and English translation thereof.

Office Action by the Korean Patent Office (KIPO) issued in KR20230158626, which is a counterpart hereof, mailed on Mar. 27, 2024, and English translation thereof.

Office Action by the Chinese Patent Office (SIPO) issued in CN202280026835.7, which is a counterpart hereof, mailed on Mar. 13, 2024, and English translation thereof.

Office Action by the Japanese Patent Office (JPO) issued in JP2023178809, which is a counterpart hereof, mailed on Jul. 30, 2024, and English translation thereof.

Office Action by the Japanese Patent Office (JPO) issued in JP2023178809, which is a counterpart hereof, mailed on Aug. 20, 2024, and English translation thereof.

* cited by examiner a)       b)       c)

METHOD FOR TINTING OR DECOLORING A LENS, LENS OBTAINABLE BY THE METHOD FOR TINTING OR DECOLORING A LENS, LENS COMPRISING A TINT OR DECOLORIZATION, LENS HOLDER AND TINTING DEVICE FOR TINTING A LENS

CROSS REFERENCE TO RELATED APPLICATION

This application is a continuation application of international patent application PCT/EP2022/058686, filed on Mar. 31, 2022 and designating the US, which claims priority to international patent application PCT/CN2021/084270, filed on Mar. 31, 2021, both of which are hereby incorporated by reference in their entireties.

TECHNICAL FIELD

The present disclosure relates to the tinting of lenses, particularly the tinting of spectacle lenses. Specifically, the present disclosure relates to a first, a second, and a third method for tinting or decoloring a lens, a lens obtainable by such methods, a lens comprising a tint or decolorization and a tinting device for generating lens tints of complex design, in particular, decentered halo and pendulum tints.

Besides, the present disclosure relates a corresponding computer program for carrying out the method.

BACKGROUND

Tints for spectacle lenses are demanded for both fashion as well as medical reasons. For sun glasses solid tinted lenses are most commonly used, however in recent years gradient tints have become more and more important providing added advantages. In general, the idea of gradually varying tints is to have full tints on the upper part of the lenses while permitting the user to see the lower field of vision in more or even full light, thus allowing glare protection and clear vision for example when driving a car. The principle of such gradient tint glasses is to increase visibility by causing the iris to expand due to the upper shading, permitting more light to enter from the actual field of vision such as a road or a computer. Similarly, there are lenses on the market comprising a darker shading in their lower part and brighter shading in their upper part.

The most common method to tint a lens with gradient is to immerse the lens (partly) into a tinting bath and to remove it gradually from the bath such that the longer a part of the lens is exposed to the tint, the darker it becomes.

Despite the benefits of these standard gradient tints, there may still be a lot of glare entering the eye in many situations, causing unnecessary eye fatigue and eye strain. This is particularly the case during demanding visual activities such as watching television, working in front of a display or reading a book, because the light from around this field of vision does not contribute to proper viewing. Quite the opposite, said light causes visually impairing refractions and reflections in the eye, and also reduces the aperture of the iris thus leading to less light being admitted to enter the eye. This results in that a computer display in the field of vision might look dim, while surrounding light might be experienced as undesirably bright.

For such situations linear gradient tints such as described above have been supplemented by annular gradient tints, where the tint density on the lenses increases from the center of the lens towards its periphery, i.e., not just in one direction, but all around the lens. These kinds of tints permit full (or almost full) entry of light from the central field of vision, while excluding damaging and distracting peripheral light from other directions.

U.S. Pat. No. 5,201,955 describes an annular gradient optical lens tint system. The system is provided for tinting eyeglass lenses wherein the lenses are engaged in a frame which is both vertically reciprocated and simultaneously rotated about on an axis central to and orthogonal to the plane of the lens so that an annular gradient tint is produced darker at the outside edges of each lens and becoming progressively lighter toward the center, with the optical center of the lens either being completely clear or substantially lighter than the rest of the lens.

However, the variety of spectacles frames and different anatomical conditions of customers require better adapted and hence more complex tint gradients for lenses. For example, the centered halo tint gradient proposed in U.S. Pat. No. 5,201,955 may not fit all eyes equally.

WO 2009/152381 A1 relates to computer eyewear for reducing the effects of Computer Vision Syndrome (CVS). In one exemplary embodiment, the eyewear comprises a frame and two lenses. The lenses can include optical treatments such as, for example, a partially transmissive mirror coating, tinting, or anti-reflective coatings.

WO 2011/123132 A1 relates to a method of dipcoating a lens comprising the steps of: immersing the lens in a coating solution bath having a horizontal coating solution surface, and withdrawing the lens from said bath through said solution surface, wherein the step of withdrawing is performed with a movement of the lens such that the orientation of the lens varies continuously, from a position in which the optical axis of the lens is inclined upwards and towards the concave surface of said lens when said lens starts emerging from said bath to a position in which the optical axis of the lens is inclined upwards and towards the convex surface of said lens when said lens finishes emerging from said bath.

GB 2 208 322 A relates to a device for supporting lenses when dipped in a tinting bath, the device comprising a suspension rod optionally suspendable from a hook-shaped portion, and optionally secured to a base plate/stirrer. Support members are secured to a connector piece, slidable along the suspension rod, by a screw passing through a slot, which allows the support members to be moved pivotally or linearly relative to its point of attachment to the connector piece. A lens holder is suspended from cranked portion of the support member. By adjustment of the position and orientation of the support member, the horizontal axis of a lens can be appropriately aligned with the surface of a tinting bath.

US 2011/107965 A1 A relates to a device for imparting a gradation of tint density on an ophthalmic or optical lens. This gradient-tinting device utilizes both vertical movement and rotation about the vertical axis of the lens as it moves into a tinting solution.

EP 2 018 954 A2 relates to an apparatus for wetting and coating ophthalmic lenses having a tank with a cleaning or coating solution and a handling system for sequentially moving a lens and the solution in relation to each other, to wet the lens. A master control module is coupled to the handling system and configured execution a wetting profile. The wetting profile moves the lens to obtain a generally consistent lens surface wetting speed so that the lens coating has a more uniform thickness. According to a method, lenses are wetted in a liquid bath. The lens is placed in a handling system which moves the lens with respect to the bath according to a wetting profile.

US 2020/255327 A1 relates to gradient tinted articles and methods of making the same.

SUMMARY

It is an object of the present disclosure to provide improved methods for tinting or decoloring a lens, an improved lens obtainable by one of the methods, an improved lens comprising a tint or decolorization and an improved tinting device. The inventors recognized that it would be desirable to allow for more complex (gradient) tints. In particular, it would be advantageous to provide a method and a tinting device allowing for (novel) decentered halo and pendulum lens tints, particularly asymmetric and/or multicolored decentered halo and pendulum lens tints. Furthermore, it would be advantageous to provide a lens comprising a corresponding novel halo and/or pendulum tint or decoloring design. Furthermore, it would be desirable to provide alternative methods for tinting/decoloring lenses with complex shading designs.

To better address one or more of these concerns, according to a first aspect of the disclosure, a first method for tinting or decoloring a lens is provided, the method comprising inserting a lens in a reception unit of a lens holder, providing an immersion bath comprising a fluid, immersing the lens holder into the fluid, and rotating the lens holder around a rotation axis to a predetermined maximum rotation angle, characterized in that the rotation axis is located outside the lens and generally perpendicular to the plane of the lens. In this case the rotation axis does not coincide with the geometric (or optical) center of the lens, i.e., does not cross the geometric (or optical) center of the lens, and the lens holder may be rotated without limitation, i.e., by 360°, or less or more. However, rotation may be limited to stay below 360° in this case as well. Typically, the rotation axis located outside the reception unit of the lens holder.

Immersing the lens holder into the fluid particularly comprises moving the lens holder in a direction perpendicular to the surface of the immersion bath. More particularly, immersing the lens holder into the fluid comprises iteratively moving the lens holder in a direction perpendicular to the surface of the immersion bath.

According to a second aspect of the present disclosure there is provided a second method for tinting or decoloring a lens, the second method comprising inserting a lens in a lens holder, providing an immersion bath comprising a first fluid, immersing the lens holder into the first fluid, and rotating the lens holder around a rotation axis to a predetermined maximum rotation angle, wherein the rotation axis is generally perpendicular to the plane of the lens, characterized in that the second method further comprises removing the lens holder from the immersion bath, rotating the lens (in the lens holder (in the plane of the lens)), and immersing the lens holder into another immersion bath comprising a second fluid, wherein the first and the second fluid comprise a tinting liquid or a decoloring liquid.

According to a third aspect of the present disclosure there is provided a third method for tinting or decoloring a lens, the third method comprising inserting a lens in a reception unit of a lens holder, providing an immersion bath comprising a first fluid, immersing the lens holder into the first fluid, and rotating the lens holder around a rotation axis to a predetermined maximum rotation angle, wherein the rotation axis is generally perpendicular to the plane of the lens, characterized in that the second method further comprises removing the lens holder from the immersion bath, displacing the lens and the reception unit with respect to the lens holder in a direction parallel to the plane of the lens with respect to the rotation axis, and immersing the lens holder into the same immersion bath or another immersion bath comprising a second fluid, wherein the first fluid and the second fluid comprise a tinting liquid or a decoloring liquid.

According to a fourth aspect of the present disclosure there is provided a lens obtainable by the first method, wherein the first method comprises immersing the lens holder partially in the immersion bath.

According to a fifth aspect of the present disclosure there is provided a lens obtainable by the second method.

According to a sixth aspect of the present disclosure there is provided a lens obtainable by the third method.

According to a seventh aspect of the present disclosure there is provided a lens comprising a tint or decolorization, characterized in that the tint or decolorization comprises at least two different gradients comprising any of an annular gradient and a pendulum gradient. For example, the lens may comprise two annular tints in two different areas of the lens with two different colors. Similarly, the lens may comprise two pendulum tints differing by their area on the lens.

In general, an annular gradient may comprise a halo or a part of a halo. Furthermore, the lens may comprise a pendulum gradient which is produced by a pendulum-like movement of the lens in the immersion bath, particularly by an asymmetric pendulum-like movement of the lens in the immersion bath, i.e., a pendulum movement generated by a movement to a first angle in a first direction and a movement to a second angle in a second direction, wherein the first angle (and first direction) is different from the second angle (and second direction). In particular, the tint or decolorization of the lens provided is not rotationally symmetric with respect to the geometric center of the lens.

According to a further aspect a first tinting device for tinting a lens is provided, the first tinting device comprising a lens holder, wherein the lens holder comprises a reception unit configured to hold the lens in a first plane, and a rotation axis generally perpendicular to said first plane, wherein the lens holder is configured to rotate around the rotation axis, an immersion bath comprising a fluid, wherein the lens holder is configured to be immersed in the fluid, and a rotation unit configured to rotate the lens holder around the rotation axis to a predetermined maximum rotation angle, characterized in that the rotation axis is located outside the lens.

Typically, the rotation axis is even located outside the reception unit. Furthermore, the lens holder may be configured to rotate around the rotation axis during immersion of the lens holder into an immersion bath.

According to yet another aspect, a, in particular non-transitory, computer program is provided, the computer program comprising program code means for causing a computer to control the first tinting device to carry out the steps of any of the above mentioned methods when said computer program is carried out on a computer or processing unit.

The basic idea of the disclosure is to provide a method for tinting or decoloring a lens which allows for novel movements of a lens in an immersion bath. In particular, in lens holders of most conventional tinting devices the lenses are generally arranged in such a manner that their geometric or optical center coincides with the rotation axis and the lens holder rotates when dipped into an immersion bath. However, with such a construction, the generation of lens tints is limited. Hence, it is an idea to locate the axis of rotation outside the lens and generally perpendicular to the lens. It is also an idea to provide a tinting method comprising at least two tinting cycles to generate a lens comprising two different colors, for example. A further idea is to adapt a depth of immersion of the lens holder into the immersion bath according to the maximum rotation angle or vice versa.

This way, a wide variety of novel, non-rotationally symmetric lens tints (or decolorizations) can be obtained. In fact, irrespective of the (maximum) angle of rotation used, novel, non-rotationally symmetric lens tints and decolorizations can be obtained. For example, lenses, rotated around an axis displaced from their geometric center such that the rotation axis is located outside the lens, may be rotated in a first direction by a first angle, for example 45°, and then back in a second direction, for example by 90°, and then again back in the first direction by 90°. In other words, the method may comprise an asymmetric pendulum-like movement in the immersion bath resulting in a totally novel lens tint or decoloring.

Another idea is to provide at least two tinting cycles, wherein the parameters of the cycles are different from each other. For example, it is an idea to remove the lens holder from the immersion bath after a first immersion of the lens holder into the immersion bath, and to change the fluid, displace the lens with respect to the rotation axis, or rotate the lens (e.g., around its own geometric center), before immersing the lens holder into the same immersion bath or another immersion bath comprising another fluid. This way, highly complex tint designs can be achieved which cannot be generated using conventional tinting methods. Such lenses may provide a targeted adaptation of the tinting for aesthetic reasons and for controlling the amount of light reaching the eye from certain regions of the lens, while at the same time enabling good manufacturability. For example, bicolored lenses may be obtained, in particular bicolored lenses, wherein in the tint or decolorization pattern on the lens is different for both colors. Of course, lenses comprising more than two colors can be obtained as well.

Another idea, is to adapt a (maximum) depth of immersion of the lens holder into the immersion bath according to the predetermined maximum rotation angle or to adapt the maximum rotation angle according to a (predetermined maximum) depth of immersion of the lens holder into the immersion bath. Adapting the (maximum) depth of immersion according to the predetermined maximum rotation angle implies that there is a fixed link between the maximum angle of rotation and the immersion depth. For example, if the maximum rotation angle is determined to be 45° in a first rotation direction and if the maximum rotation angle is 60° in the second rotation direction and the 45° angle is linked to a maximum immersion depth of 3 cm, whereas the 60° angle is linked to a maximum immersion depth of 4 cm, the lens holder is immersed to a depth of 3 cm if the lens holder is rotated to the maximum rotation angle in the first direction and is immersed to a depth of 4 cm if the lens holder is rotated to the maximum rotation angle in the second direction. In other words, the rotation to the predetermined maximum rotation angle and the simultaneous immersion of the lens holder into the immersion bath follow a predetermined pattern, wherein the maximum rotation angle is tied to a predetermined (maximum) immersion depth (or vice versa). Put differently, the (maximum) depth of immersion of the lens holder may depend on the (predetermined) maximum rotation angle and/or the maximum rotation angle may depend on the predetermined (maximum) depth of immersion.

In many known methods for lens tinting immersion into the immersion bath and rotational movement of the lens holder is totally independent from each other. Hence, reproduction of lens tints with the same design can hardly be achieved. According to the above-mentioned idea, however, rotational movement and vertical movement, i.e., immersion movement, are linked to each other by a predetermined pattern. In other words, the (maximum) rotation angle (or any rotation angle) of the lens holder is coupled to the immersion depth of the lens holder in the immersion bath according to a predetermined pattern. This way, if the same pattern (of tinting or decoloring) is applied in another tinting/decoloring cycle it is ensured that lenses with the same tinting or decoloring design can be reproduced.

Accordingly, it is an idea to adapt a conventional lens holder to comprise a reception unit which is (or can be) shifted away from the rotation axis of the lens holder to such an extent, that the rotation axis is located outside the lens or outside the reception unit. For conventional lens holders the rotation axis of the lens holder and the geometric (or optical) center of the lenses inserted generally coincide. In other words, conventional lens holders comprise reception units which are rigidly fixed in a rotationally symmetric manner around the rotation axis of the lens holder. This however, only allows for limited types of lens tints, particularly lens tints which are symmetric to the geometric (or optical) center of a lens. By providing a rotation axis which is located outside the lens or outside the reception unit, lenses may also be tinted according to other designs, particularly designs that are not symmetrical with respect to the center point of the lens.

Exemplary embodiments of the disclosure are defined in the dependent claims. It shall be understood that the claimed computer program can have similar and/or identical refinements or exemplary embodiments as the claimed methods, lens holder or tinting devices, in particular as defined in the dependent claims and as disclosed herein.

In the following, some terms which are used throughout the application, shall be shortly explained and defined:

The term "lens" may generally be understood as lens blank, i.e., as a blank from which a lens can be cut out for example. However, it may likewise be understood as spectacle lens. Still, the term "lens" may also comprise other kinds of lenses of visual aids, such as lenses for microscopes or telescopes. Furthermore, the term "lens" may comprise a flat glass, wherein the term "glass" is to be understood as any material suitable for a lens. Hence, the term "glass" also comprises plastic glass. With a flat glass, particularly glasses allowing for distortion-free imaging are meant. Apart from that, the term "lens" may comprise any (curved) piece of a transparent material, particularly a shield (typically suitable for the eyes, e.g., wearable on a user's nose), more particularly a shield for a helmet, for example, or a mono lens.

The term "rotation axis" does not necessarily imply a physical axis, but may likewise comprise an imaginary axis.

The definition of a "rotation below 360°" may comprise a rotation by less than 360° in one direction or a rotation by less than 180° in a first and second direction, respectively. For example, a rotation below 360° may comprise a rotation by 10° or 359° in one direction. Likewise, a rotation below 360° may comprise a rotation by x° in a first direction and y° in a second direction, respectively, wherein (x+y) is less than 360°. For example, a rotation below 360° may comprise a rotation by 179° in a first direction and 179° in a second direction, respectively.

The term "reception unit" defines a part of the lens holder being particularly configured to receive (and hold) one or more lenses. A reception unit may comprise a frame in which one or more lenses can be inserted or a clamp for clamping a lens. However, any other construction suitable for receiving (and holding) a lens may be defined as reception unit.

The term "reception area" may generally be understood as part of the reception unit, in particular as an area or space a lens occupies when received by the reception unit. For example, in a case where the reception unit comprises a frame configured to hold a lens, the reception area may be defined as the area inside the frame, i.e., the area enclosed by the frame. Similarly, if the reception unit comprises rods, in particular rods comprising notches, configured to hold a lens, the reception area can be understood as the space enclosed by the rods, or more particularly as the area a lens occupies when inserted between the rods or in the notches of the rods.

The term "geometric center" may be understood as generally defined, i.e., as the arithmetic mean position of all the points of an object. Another term often used for geometric center is centroid.

The term "fluid" is to be understood as a substance that continually deforms under an applied shear stress, or external force. In particular, a fluid comprises a liquid, a gas or plasma. In particular, a fluid may comprise a tinting liquid for tinting a lens or a tinting vapor for tinting a lens, wherein tinting is to be understood as applying color and/or a shading to a lens. Likewise, a fluid may comprise a decoloring liquid for decoloring a lens or a decoloring vapor for decoloring a lens, wherein the decoloring liquid or decoloring vapor, i.e., the decoloring fluid, may define any kind of liquid or vapor suitable for removing color of a lens, in particular for bleaching a lens.

The term "tinting liquid" is to be understood as a liquid comprising tint configured to tint the lens.

The term "decoloring liquid" is to be understood as liquid comprising a decoloring substance configured to decolorize the lens.

The term "gradient" is particularly used to describe the intensity distribution of a tinting or decoloring of a lens across the lenses surface. In particular, the term "gradient tint" is used to describe a shading of a lens, more particularly a gradually varying intensity of tint on the lens, in a direction parallel to lenses surface, with increasing intensity in a first direction and decreasing intensity in the opposite direction. Similarly, the term "gradient decolorization" is used to describe a gradient with respect to the intensity of decolorization in a direction parallel to lenses surface.

The term "immersion bath" may be understood as a reservoir for a fluid in which a lens holder, and hence a lens, may be immersed or dipped. An immersion bath may comprise liquid in a tub or tank, for example. The liquid may comprise tint, decoloring liquid or any other kind of liquid suitable for tinting for decoloring a lens.

The term "servo motor" may be understood as a rotary actuator or linear actuator which allows for precise control of angular or linear position, velocity and acceleration. In general, a servomotor is understood to comprise a suitable motor coupled to a sensor for position, velocity and/or acceleration feedback.

The term "belt drive" is to be understood as a drive comprising at least a belt and two pulleys, wherein power is transmitted between the at least two pulleys by the belt. In particular, a first pulley is configured to drive the belt which in turn drives the second pulley. In particular, a pulley may comprise a shaft. Examples of belts comprise flat belts, V-belts and toothed belts.

The term "annular gradient" is to be understood as a gradient extending in all radial directions around a center point in a plane through the center point. However, the gradient does not necessarily have to be the same in all directions. An annular gradient displaced from a particular point shall be understood as an annular gradient with a center point displaced from this particular point. An annular gradient can also be understood as "annular gradient design." A partial annular gradient is to be understood as a section of an annular gradient design.

The term "pendulum gradient" is to be understood as a gradient formed by a pendulum-like movement of a lens in the immersion. Depending on whether the tint or decolorization formed is symmetrical or asymmetrical with respect to the geometric center of the lens, the gradient can be categorized into "centered pendulum gradient" and "decentered pendulum gradient."

The term "center of the gradient" with respect to an annular, partial annular or pendulum tint is to be understood as the point around which the lens has to be rotated to achieve the desired gradient, i.e., the point in the plane of the lens where the rotation axis is located.

The term "generally perpendicular to" is to be understood as "perpendicular to" or "having a 90° angle with" with a tolerance of +/−10°, typically +/−5°, more typically +/−2.5°, even more typically +/−1°.

The term "maximum rotation angle" is to be understood as the maximum angle the lens holder is rotated to (before stopping rotation and/or changing the direction of rotation).

The term "maximum depth of immersion" is to be understood as the deepest point of immersion (before holding the lens holder or before upwardly pulling out the lens holder from the immersion bath).

In an exemplary embodiment of the first method, the first method further comprises displacing the reception unit from the rotation axis, typically during immersion. The reception unit and hence the lens may either be continuously or stepwise displaced, wherein the size of the steps may range between at least one of between 1 mm and 20 mm, in particular between 2 mm to 15 mm, in particular between 3 mm and 10 mm, in particular between 5 mm and 8 mm. Typically, the lens is displaced form the rotation axis in radial direction.

By adjusting the displacement, the asymmetry of the lens tints can be varied. An advantage of this approach, particularly when performed during immersion, is that complex tint designs can be created in a single tinting cycle, i.e., without the need to remove the lens holder from the immersion bath and/or to modify a tinting device as a whole. Hence, a variety of totally novel lens tints can be created. Furthermore, complex lens tints can be produced in faster, cheaper, and less complicated manner.

In another exemplary embodiment of the first method, the lens holder is rotated in a first direction to a first position at a first predetermined angle and/or in a second direction to a second position at a second predetermined angle, wherein the first predetermined angle is different from the second predetermined angle. For example, the lens holder may be rotated in the first direction by 45° and in the second direction by 90°, or it may be rotated in the first direction by 45° and in the second direction by 45°.

In another exemplary embodiment of the first method, the lens holder is held in the first position for a first time period and in the second position for a second time period, wherein the first time period is different from the second time period. This way, the intensity of the lens tint or decolorization can be varied for different areas of the lens.

In another exemplary embodiment of the first method, immersing the lens holder into the fluid comprises moving the lens holder in a direction perpendicular to the surface of the immersion bath. Typically, the speed and distance/depth of moving the lens holder can be adapted. For example, the lens holder may be moved by a first distance, i.e., first depth, into the immersion bath and likewise may be moved in opposite direction, i.e., out of the immersion bath, by a second distance, i.e., second depth, which is different from the first distance (depth).

In an exemplary embodiment, immersing the lens holder into the fluid comprises immersing the lens holder completely or partially in the immersion bath. In particular, the reception unit/reception area of the lens holder may be immersed completely or partially into the immersion bath by moving the lens holder. Accordingly, the lens (or the lenses) may be immersed completely or partly in the immersion bath.

In a further exemplary embodiment, the first method comprises adapting a maximum depth of immersion of the lens holder into the immersion bath according to the predetermined maximum rotation angle of the lens holder.

In another exemplary embodiment, the lens holder is moved in the direction perpendicular to the surface of the immersion bath by a servo motor. Using a servo motor supports smooth and constant movement and hence a precise tinting or decoloring of the lens.

In a further exemplary embodiment, the lens holder is rotated by a belt drive. Hence, the angular position of the lens can be adapted precisely. This allows for precise (angle-dependent) tinting or decoloring of the lens.

In another exemplary embodiment of the first method the fluid comprises a liquid, particularly a tinting liquid comprising tint configured to tint the lens, or a decoloring liquid configured to decolorize the lens. However, the fluid may likewise comprise a vapor or fog, particularly a tinting vapor configured to tint the lens or a decoloring vapor configured to decolorize the lens.

In a further exemplary embodiment, the first method comprises steps of removing the lens holder from the immersion bath, any of changing the fluid, displacing the lens (particularly the geometric center of the lens) with respect to the rotation axis, or rotating the lens around its own geometric center, and immersing the lens holder into the same or another immersion bath. Accordingly, the method may comprise two or even more tinting or decoloring cycles, i.e., periods of tinting/decoloring the lens or, in other words, running periods of the tinting device. For example, the tinting liquid used in a first tinting cycle may be changed such that for a second tinting cycle a tint with a different color may be used. Similarly, the lens, which may be positioned in a first position in a first cycle, may be shifted away from said position before another tinting (or decoloring) cycle.

In an exemplary embodiment of the lens, the lens comprises an ophthalmic lens, flat glass, a mono lens or a shield, particularly a helmet shield.

In another exemplary embodiment of the lens, the lens comprises a polygonal shape, particularly a triangular or quadrangular shape.

In an exemplary embodiment of the first tinting device the reception unit of the lens holder is configured to be displaced from the rotation axis in a plane parallel to the first plane, in particular configured to be adjustably displaced, more particularly configured to be adjustably displaced by 40 mm. In another exemplary embodiment, the reception unit of the lens holder can be displaced by up to 10 mm, in particular by up to 15 mm, in particular by up to 20 mm, in particular by up to 30 mm, in particular by up to 40 mm. In one exemplary embodiment, the reception unit of the lens holder can be displaced by at least 5 mm, in particular by at least 10 mm, in particular by at least 15 mm, in particular by at least 20 mm. The position of the reception unit may either be adjustable continuously or stepwise, wherein the size of the steps may range between at least one of between 1 mm and 20 mm, in particular between 2 mm to 15 mm, in particular between 3 mm and 10 mm, in particular between 5 mm and 8 mm. Typically, the reception unit is configured to be displaced form the rotation axis in radial direction.

By adjusting the amount of shifting, i.e., displacing, the design of the lens tints can be varied, particularly if the displacement is performed during a tinting cylcle, i.e., during immersion of the lens into the immersion bath. For shifting, the reception unit may comprise a shifting element, for example, which is configured to be shifted inside a so called decentration area of the lens holder. An advantage of this approach is that complex tint designs can be created in a single tinting cycle, i.e., without the need to remove the lens holder from the immersion bath and/or to modify the tinting device as a whole. Hence, a variety of totally novel lens tints can be created. Furthermore, complex lens tints can be produced in faster, cheaper and less complicated manner.

In another exemplary embodiment of the first tinting device the reception unit of the lens holder comprises a guiding element configured to support a positioning of the lens in the lens holder, or more particularly in a reception area of the lens holder. The guiding element may be a marker such as a colored dot, for example, marking a desired positioning of the lens. Likewise, the guiding element may be a recess or protrusion in the reception unit or the guiding element may be a bar, for example, configured to be inserted in a notch on the edge of a lens, for example. The guiding element allows for precise positioning of the lens in the lens holder and hence for precisely applied tints and shadings.

In a further exemplary embodiment, the lens holder of the first tinting device comprises two opposing plates, wherein the plates are generally parallel to the first plane and wherein the reception unit comprises a connecting element configured to connect the plates. The connecting element may be a rod or a panel connection the plates, for example. Typically, the plates are round discs. More typically, the plates comprise a decentration area and the reception unit comprises a shifting element, wherein the shifting element can be shifted within the decentration area.

In an exemplary embodiment, the connecting element comprises a recess and/or protrusion for holding the lens. For example, the connecting element may comprise a notch or a protruding clamp for clamping the lens. This way, it can be ensured that the lens is held by the lens holder in a fixed position.

In another exemplary embodiment of the first tinting device the reception unit of the lens holder is configured to hold three or more lenses. In such case guiding elements supporting positioning of the lenses are particularly helpful. This is because these guiding elements may indicate a desired position and/or orientation of the lenses to be tinted. Hence, a user can insert a plurality of lenses in the lens holder in the same orientation easily so that a plurality of lenses can be tinted in the same way at the same time. In particular, this allows for precise tinting effects for a plurality of lenses, i.e., for mass production with high precision.

In another exemplary embodiment of the first tinting device the rotation unit is configured to rotate the lens holder in a first direction to a first position at a first predetermined angle and in a second direction to a second position at a second predetermined angle. Hence, rotational movement of the lens holder may be performed in an asymmetrical manner. For example, the lens holder may be configured to rotate in the first direction by 90° and in the second direction by 60°.

Typically, the rotation unit may also be configured to adapt the speed of rotation.

In another exemplary embodiment of the first tinting device the rotation unit is configured to hold the lens holder in the first position for a first time period and in the second position for a second time period, wherein the first time period is different from the second time period. This allows for different tint or decolorization intensities in different areas of the lens and hence for totally novel tinting or decolorization designs.

In yet another exemplary embodiment of the first tinting device the rotation unit is configured to adapt the predetermined maximum rotation angle of the lens holder according to a depth of immersion of the lens holder into the immersion bath.

In an exemplary embodiment of the first tinting device, the rotation unit comprises a belt drive. Using a belt drive may stabilize the rotation of the lens holder in the tinting device. However, other kinds of drives are conceivable as well.

In another exemplary embodiment, the first tinting device further comprises a lifting unit configured to move the lens holder in a direction perpendicular to the surface of the immersion bath. The lifting unit may be belt-driven. Typically, the lifting unit is configured to adapt the amount of movement, i.e., the distance the lens holder moves or the immersion depth, and to adapt the speed of movement. For example, the lifting unit may be configured to move the lens holder by a first distance into the immersion bath and to move the lens holder in opposite direction, i.e., out of the immersion bath, by a second distance.

In an exemplary embodiment of the first tinting device, the lifting unit is configured to immerse the lens holder completely or partially in the immersion bath by moving the lens holder. In particular, the lifting unit may be configured to immerse the reception area of the lens holder completely or partially in the immersion bath by moving the lens holder. Accordingly, the lifting unit is configured to immerse the lens (or the lenses) held by the reception unit in the reception area completely or partly in the immersion bath.

In yet another exemplary embodiment, the lifting unit is configured to be driven by a servo motor. Likewise, the rotation unit may be driven by a servo motor. This ensures smooth and constant linear movement or rotation, respectively.

In another exemplary embodiment, the lifting unit is configured to adapt a maximum depth of immersion of the lens holder into the immersion bath according to the predetermined maximum rotation angle of the lens holder. In other words, the lifting unit may be configured to adapt the movement of the lens holder depending on the maximum rotation of the lens holder as induced by the rotation unit. However, likewise the rotation unit may be configured to adapt the angle of rotation of the lens holder dependent on the movement of the lens holder as induced by the lifting unit. For example, if the lens holder is rotated in the first direction by 5°, the lifting unit may be configured to move the lens holder being completely above the immersion bath towards the immersion bath, such that the lens holder immerses in the immersion bath by a first immersion depth. That is, the linear movement induced by the lifting unit and the maximum rotational movement induced by the rotation unit may be linked to one another.

In yet another exemplary embodiment, the tinting device further comprises a stirring mechanism configured to stir the immersion bath. The stirring mechanism ensures that the tint or decoloring liquid is uniformly distributed in the immersion bath.

Apart from that, the tinting device may further comprise a heating element configured to heat the immersion bath.

It is to be understood that the features mentioned above and those yet to be explained below may be used not only in the combination respectively indicated, but also in other combinations or separately, without departing from the scope of the present disclosure.

BRIEF DESCRIPTION OF THE DRAWINGS

These and other aspects of the disclosure will be apparent from and elucidated with reference to the exemplary embodiments described hereinafter. The disclosure will now be described with reference to the drawings wherein:

FIG. 2A shows a variety of lenses obtainable with a conventional method for tinting or decoloring a lens;

DESCRIPTION OF EXEMPLARY EMBODIMENTS

Figure 1:
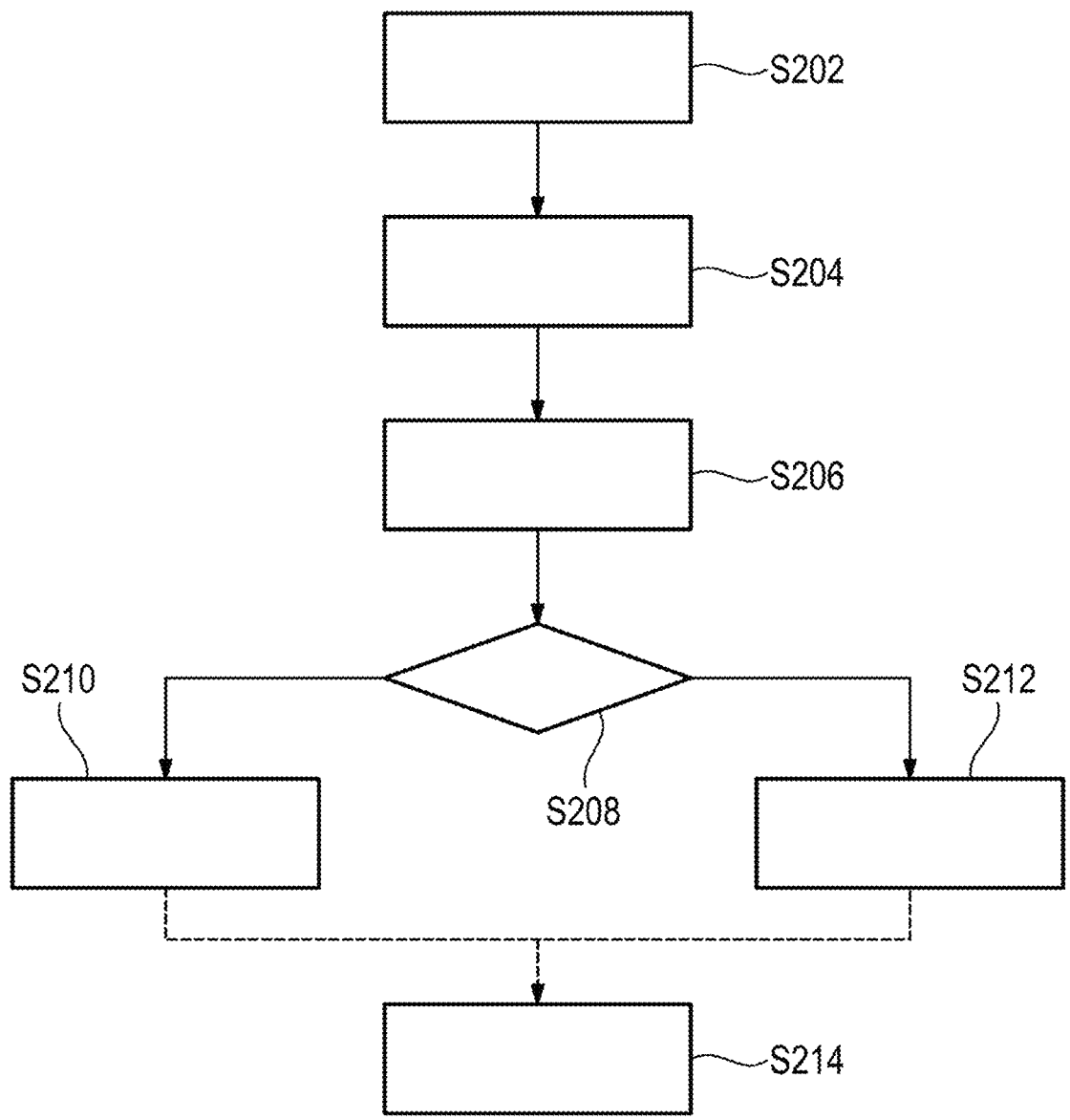
FIG. 1 shows a flowchart of a first exemplary embodiment of a method for tinting or decoloring a lens according to an aspect of the present disclosure.

FIG. 1 shows a flowchart of a first exemplary embodiment of a method for tinting or decoloring a lens according to an aspect of the present disclosure. In a first step S202 a lens (or a plurality of lenses) is inserted in a lens holder. The lens holder may either comprise a conventional lens holder in which the lenses are arranged in such a manner that the geometric center of the lens coincides with the rotation axis of the lens holder, or there may be used a lens holder according to an aspect of the present disclosure, wherein the geometric center of the lens inserted may be shifted away from the rotation axis.

In a second step S204 an immersion bath comprising a fluid is provided. The fluid may be a tinting liquid or a bleaching (decolorizing) liquid, for example. As the chronological order of steps S202 and S204 is of no relevance, step S204 may be performed before step S202.

In a third step S206 the lens holder is immersed into the fluid of the immersion bath. The lens holder may either be immersed completely or partly into the immersion bath.

In step S208 it is decided whether step S210 or step S212 is performed as a next step. This decision is based on the lens holder used. More particularly, this decision is based on the arrangement of the lens in the lens holder. If the rotation axis of the lens holder is not located outside the reception unit or outside the lens, i.e., crosses the reception area or the lens, step S210 is performed. Step S210 comprises adapting a maximum depth of immersion of the lens holder into the immersion bath according to the (predetermined) maximum rotation angle or adapting the maximum rotation angle according to a (predetermined maximum) depth of immersion of the lens holder into the immersion bath. However, if it is checked and verified in step S208 that the rotation axis is located outside the lenses in the lens holder (or outside the reception unit) the lens holder is allowed to rotate independently from the depth of immersion of the lens holder in the immersion bath (S212).

Optionally, the method of this exemplary embodiment further comprises step S214, i.e., removing the lens holder from the immersion bath, any of changing the fluid, displacing the lens with respect to the rotation axis, or rotating the lens around its own geometric center, and immersing the lens holder into the same or another immersion bath.

FIG. 2A shows a first variety of lenses obtainable with a conventional method for tinting or decoloring a lens. FIG. 2A, panel a) shows a centered halo lens tint. FIG. 2A, panel b) shows a further variation of a similar tinting. FIG. 2A, panel c) shows a lens with an inverted centered halo. These kind of tints can be obtained by a method comprising immersing the lenses partly in an immersion bath and rotating them by at least 360° around an axis crossing the geometric center of the lenses and being perpendicular to the lens plane.

Figure 2B:
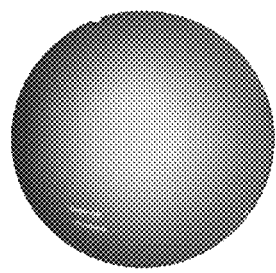
FIG. 2B shows a first variety of lenses obtainable with a second exemplary embodiment of a method according to an aspect of the present disclosure.
Figure 2B:
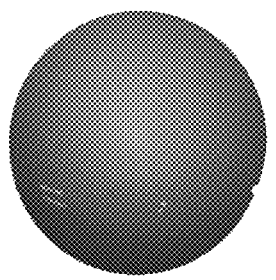
Figure 2B:
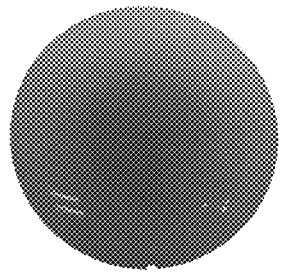
Figure 2B:
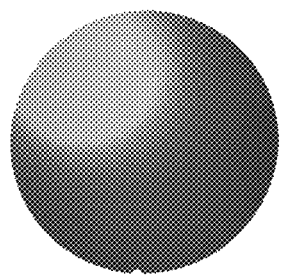
Figure 2B:
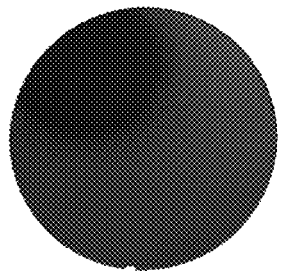
Figure 2B:
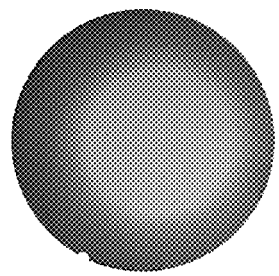
Figure 2B:
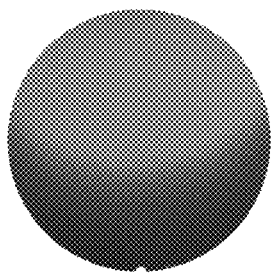

FIG. 2B shows a first variety of lenses obtainable with a second exemplary embodiment of a method according to an aspect of the present disclosure. All lenses (more particularly lens tints) shown in FIG. 2B can be obtained by the method comprising displacing the geometric center of the lens from the rotation axis of the lens holder or by using a lens holder where the reception unit is displaced from the rotation axis. The lens holder is rotated by at least 360°. FIG. 2B, panel a), shows a lens with a decentered halo tint. This kind of tint can be achieved if the lens, and in particular the geometric center of the lens, is positioned away from the rotation axis of the lens holder. Furthermore, the rotation axis should be arranged to lie in a plane parallel above the surface of the immersion bath, i.e., outside of the immersion bath comprising tint. Then, if the lens holder is rotated around its rotation axis, the tint design shown in FIG. 2B, panel a), is obtained. FIG. 2B, panel b), shows a lens with an inverted decentered halo. The method used may be the same as for lens shown in FIG. 2B, panel a), with the only difference being that the rotation axis should lie in a plane parallel, but below the surface of the immersion bath, i.e., inside the immersion bath.

FIG. 2B, panel c), shows a pair of lenses comprising a decentered halo tint. The positioning of the halos can be adjusted precisely by fixing the lens in the lens holder in a predefined position, in particular in a predefined distance from the rotation axis of the lens holder and in a predefined angular position with respect to the geometric center of the lens. FIG. 2B, panel d), shows another pair of lenses comprising a decentered halo. However, in FIG. 2B, panel d), the halo is only applied partly to the lenses. In particular, FIG. 2B, panel d), shows lens tints whose center of the gradient is located outside the lens, but close to the edge of the lens. In other words, to achieve a lens as shown in FIG. 2B, panel d), the rotation axis has to be located outside the lens. Different halo sizes can be obtained by adapting the depth of immersion into the immersion bath and by displacing the rotation axis.

Figure 3:
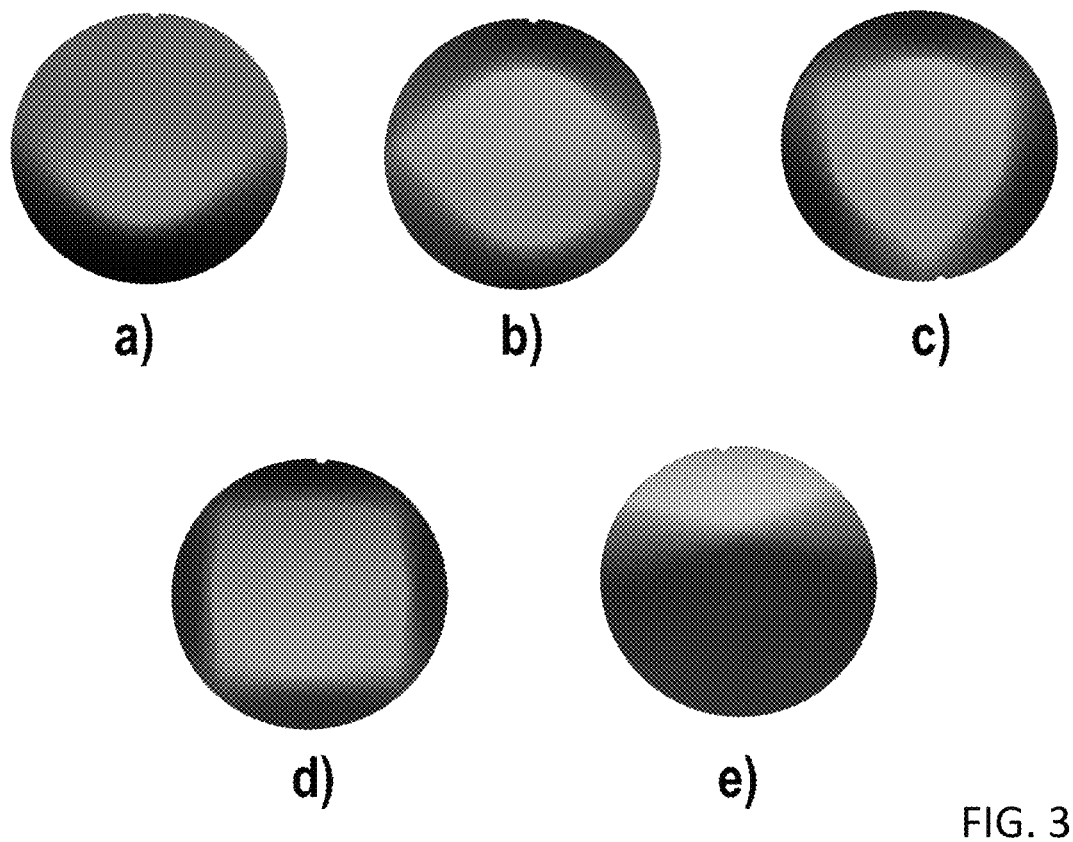
FIG. 3 shows a second variety of lenses obtainable with a third exemplary embodiment of a method according to an aspect of the present disclosure.

FIG. 3 shows a second variety of lenses obtainable with a method according to an aspect of the present disclosure. FIG. 3, panel a), shows a lens with a tint called "centered single pendulum." This kind of tint may be obtained if the rotation axis of the lens holder is positioned in a plane parallel above the surface of the immersion bath, i.e., outside of the immersion bath, and if the lens holder is rotated in both directions by only about 90°. FIG. 3, panel b), shows a lens with a tint called "centered dual pendulum." This kind of tint can be achieved in the same manner as the tint shown in FIG. 3, panel a), with the lens being rotated by 180° in the lens plane between tinting cycles. Similarly, the tint shown in FIG. 3, panel c), i.e., the "centered triple pendulum" tint, can be achieved if the lens tinted as shown in FIG. 3, panel a), is rotated by 120° degrees before another immersion into the immersion bath 104. FIG. 3, panel d), shows a "centered rectangular pendulum" tint. This kind of tint can be achieved if the lens tinted as shown in FIG. 3, panel a), is rotated by 90° degrees before another tinting cycle in the immersion bath 104. Hence, the lens tints shown in FIG. 3, panels b), c), and d), may be achieved according to an exemplary embodiment of the second method according to the present disclosure. FIG. 3, panel e), shows a "surplus pendulum tint" as a further example of a tailored tinting that can be provided by controlling immersion depth based on angular rotation. Said lens tint can be achieved by an exemplary embodiment of the third method disclosed in the present application.

Figure 4:
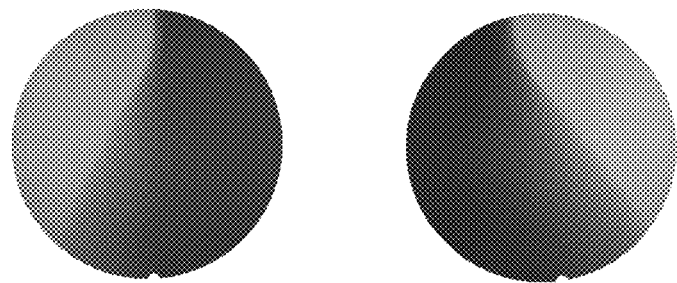
FIG. 4 shows a pair of lenses obtainable with a fourth exemplary embodiment of a method according to an aspect of the present disclosure.

FIG. 4 shows a pair of lenses obtainable with another exemplary embodiment of the second method according to an aspect of the present disclosure. In this embodiment the geometric center of the lenses is shifted away from the rotation axis of the lens holder. Furthermore, in a first tinting cycle, the lens holder is rotated by at least 360°, wherein in a second cycle, the rotation of the lens holder is limited to be less than 360°. More particular, the lens holder is rotated in a first direction by less than 180° and in a second direction by less than 180° degrees. Since the reception unit is decentered for obtaining the tint shown in FIG. 4 and since the holder is rotated like a pendulum, the tint shown in FIG. 4 is called "decentered pendulum halo."

Figure 5:
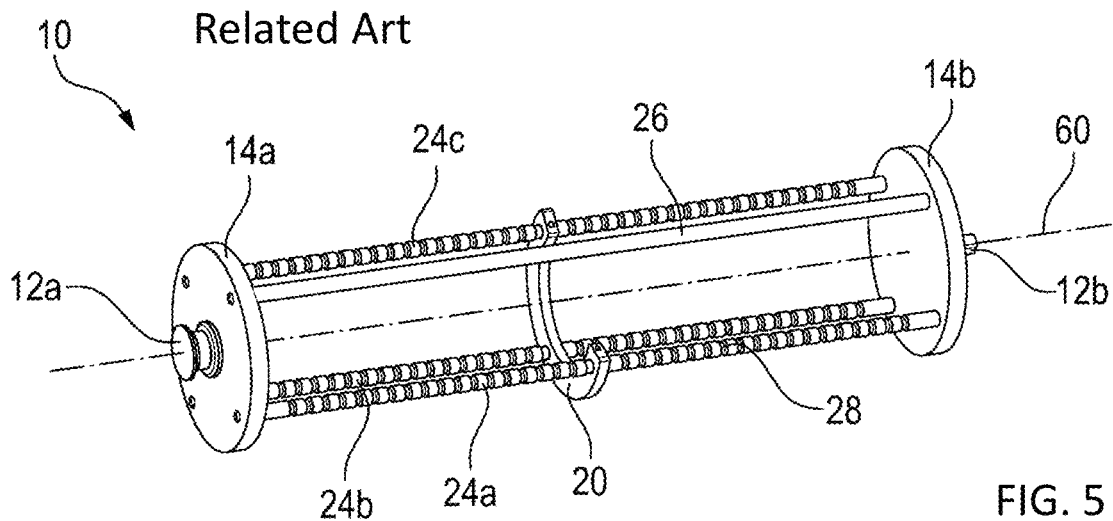
FIG. 5 shows an exemplary embodiment of a lens holder as known from the related art.

FIG. 5 shows a conventional lens holder 10 configured for tinting a plurality of lenses at the same time. The lens holder 10 comprises two opposing plates 14a and 14b which are connected by three rods 24a, 24b and 24c. The three rods 24a, 24b and 24c comprise a plurality of notches 28. A lens 50 to be tinted can be inserted in the notches of the rods and fastened by a bar 26 insertable between the plates 12a and 12b. The bar 26 is configured to apply a force onto a lens positioned in the notches, in particular, to force the lens to remain inside the notches 28 of the rods. Accordingly, the three rods 24a, 24b and 24c and the bar form a reception unit 20.

On the side of the plates showing away from the rods and the bar, the plates 14a and 14b each comprise a shaft 12a and 12b, respectively. The lens holder 10 may be rotated around an (imaginary) rotation axis 60 extending through the shafts 12a and 12b. Typically, the shafts 12a and 12b are positioned in the geometrical center of the plates 14a and 14b. The reception unit 20 is typically arranged in such a manner, that the geometric center of the lenses 50 held by the reception unit 20 is positioned on the rotation axis 60. Hence, when rotating the lens holder 10 around the rotation axis 60, the lenses 50 inserted in the lens holder are rotated around their geometric center.

Figure 6:
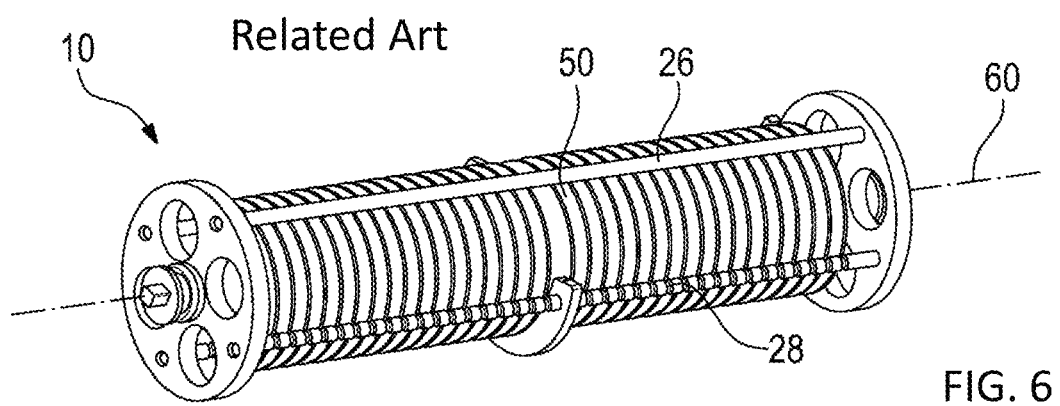
FIG. 6 shows the exemplary embodiment of the lens holder of FIG. 5 with a plurality of lenses being inserted in the lens holder.

FIG. 6 shows the conventional lens holder 10 of FIG. 5 with lenses 50 inserted in the reception unit 20. As can be seen, the lenses 50 are clamped between the rods 24a, 24b and 24c and the bar 26. In particular, the lenses are fixed by the notches 28 of the rods, thereby preventing a shifting of the lenses.

Figures 7A, 7B:
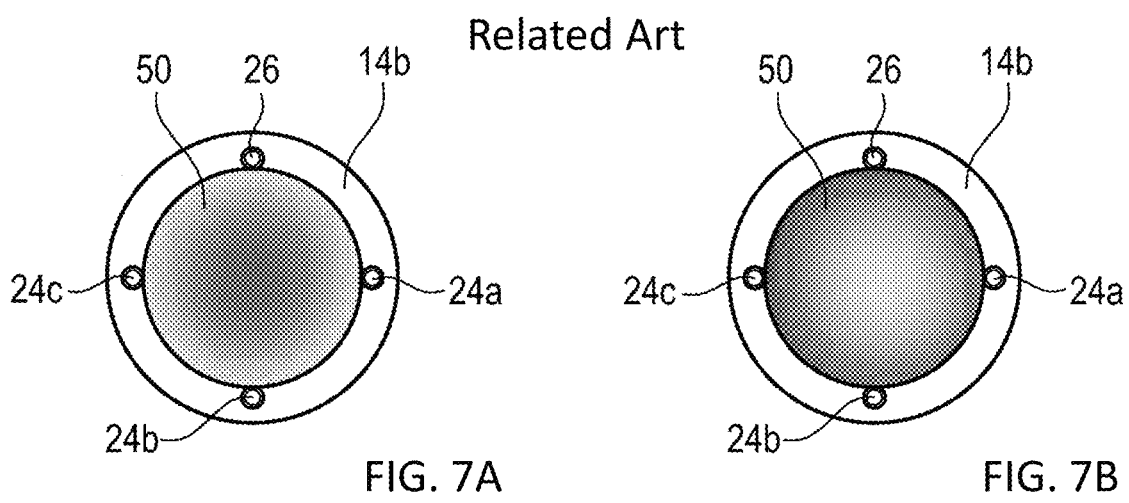
FIGS. 7A and 7B show schematic drawings of a lens in a lens holder as shown in FIG. 5 after tinting.

FIGS. 7A and 7B show schematic drawings of a lens in a lens holder 10 as shown in FIG. 6 after tinting. In particular, FIG. 7A shows a front view of a lens 50 inserted in a lens holder 10 comprising three rods 24a, 24b and 24c and a bar 26. The tint of the lens 50 can be achieved by a tinting procedure in which the lens holder 10 (and hence the lens 50) is rotated by at least 360° (or a multiple of 360°) around its rotation axis 60 while being immersed in an immersion bath of varying depth. In fact, such a so called centered halo tinted lens may be produced by using a rotating lens holder 10 reciprocating in an immersion bath in such a manner that the rotation axis 60 remains below the surface of the immersion bath throughout the tinting procedure. The tint of the lens shown in FIG. 7A "inverted centered halo tint."

FIG. 7B shows a front view of a lens 50 inserted in a lens holder 10 comprising three rods 24a, 24b and 24c and a bar 26. The lens is tinted with a so-called centered halo tint. This kind of tint can be achieved by using a solid tinted lens in the tinting procedure as described with respect to FIG. 7A, wherein the immersion bath comprises a decoloring liquid instead of a tint. However, the same kind of tinting may be achieved by using a tint in the immersion bath while the rotation axis 60 of the lens holder remains above the surface of the immersion bath throughout the tinting procedure.

Figure 8:
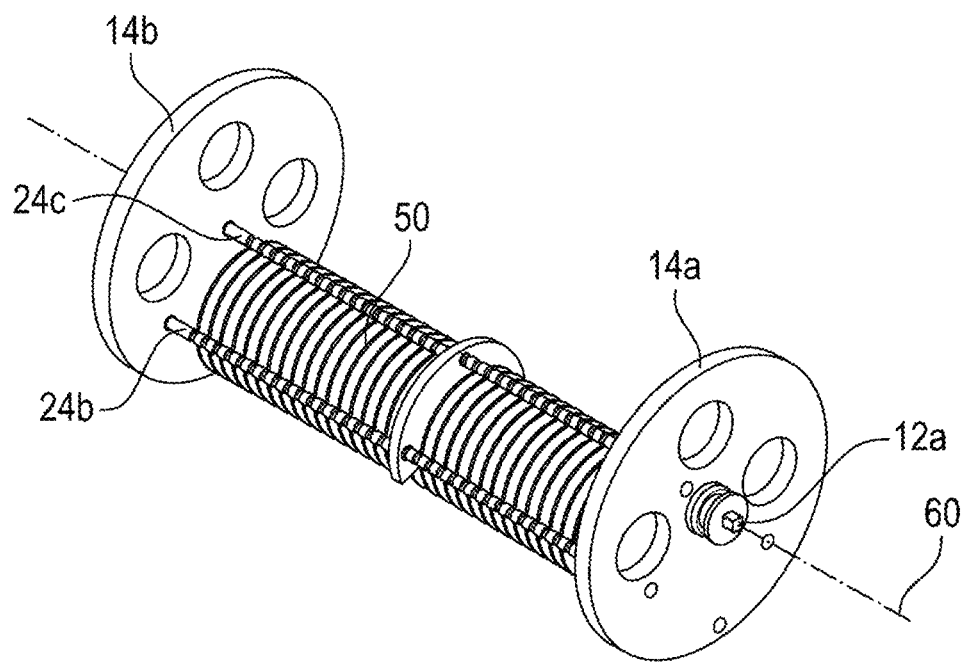
FIG. 8 shows a first exemplary embodiment of a lens holder for use in an exemplary embodiment of a tinting device according to an aspect of the present disclosure.

FIG. 8 shows a first exemplary embodiment of a lens holder 10 for use in an exemplary embodiment of a tinting device according to an aspect of the present disclosure. The lens holder 10 comprises two opposing plates 14a and 14b which are connected by three rods 24a, 24b and 24c. The three rods 24a, 24b and 24c comprise a plurality of notches 28. A lens 50 to be tinted can be inserted in the notches of the rods and fastened by a bar 26 which is configured to apply a force onto an inserted lens forcing the lens to remain inside the notches 28 of the rods. The lens holder 10 further comprises two shafts 12a and 12b on the outer side of the plates 14a and 14b, respectively. The shafts 12a and 12b are configured to be inserted in a reception for the shafts of a tinting device, thereby allowing a rotation of the lens holder 10 around the rotation axis 60 extending through the shafts 12a and 12b. As opposed to the conventional lens holder shown in FIGS. 5 and 6, the lens holder 10 of the present disclosure comprises a reception unit that is shifted away from the rotation axis 60. In particular, the geometric center of the reception area for the lenses is displaced with respect to the rotation axis 60. To be more precise, the rotation axis of the lens holder is located outside the lenses (and even outside the reception).

Figure 9A:
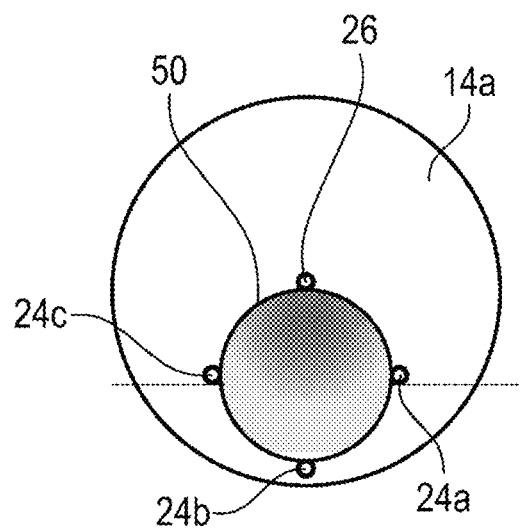
FIGS. 9A and 9B show schematic drawings of a lens in a lens holder as shown in FIG. 8 after tinting.
Figure 9B:
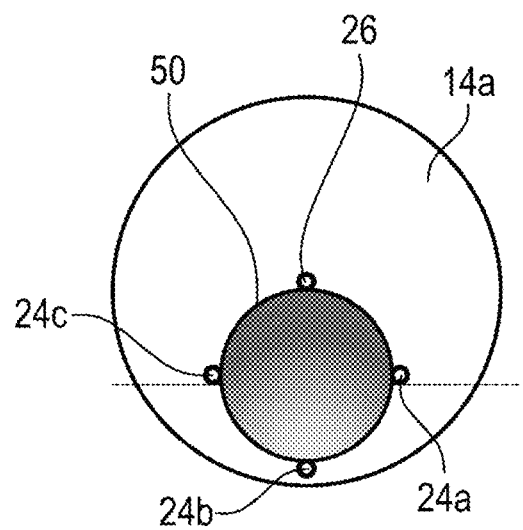

FIGS. 9A and 9B show schematic drawings of a lens 50 in a lens holder 10 as shown in FIG. 8 after tinting. In particular, FIG. 9A shows a front view of a lens 50 inserted in a lens holder 10 comprising three rods 24a, 24b and 24c and a bar 26. The tint of the lens 50 in FIG. 9A reflects a so called inverted decentered halo tint with the center of the gradient being located outside the lens, but close to the edge of the lens. By inserting a solid tinted lens 50 in the lens holder 10 as shown in FIG. 8, for example, and immersing said lens holder 10 (and the lens) partially into an immersion bath comprising a decoloring liquid while rotating the lens holder around its rotation axis by at least 360° the inverted decentered halo tint can be achieved. The gradual shading of the tint can be achieved if the lens holder 10 is moved (slightly) up and down with respect to the surface of the immersion (which is indicated by the dashed line) while the lens holder 10 is rotated.

FIG. 9B also shows a front view of a lens 50 inserted in a lens holder 10 comprising three rods 24a, 24b and 24c and a bar 26. The tint of the lens 50 shown is a decentered halo tint and can be achieved by the tinting procedure as applied to the lens shown in FIG. 9B, except that the lens 50 is exposed to tint instead of decoloring liquid.

Figure 10:
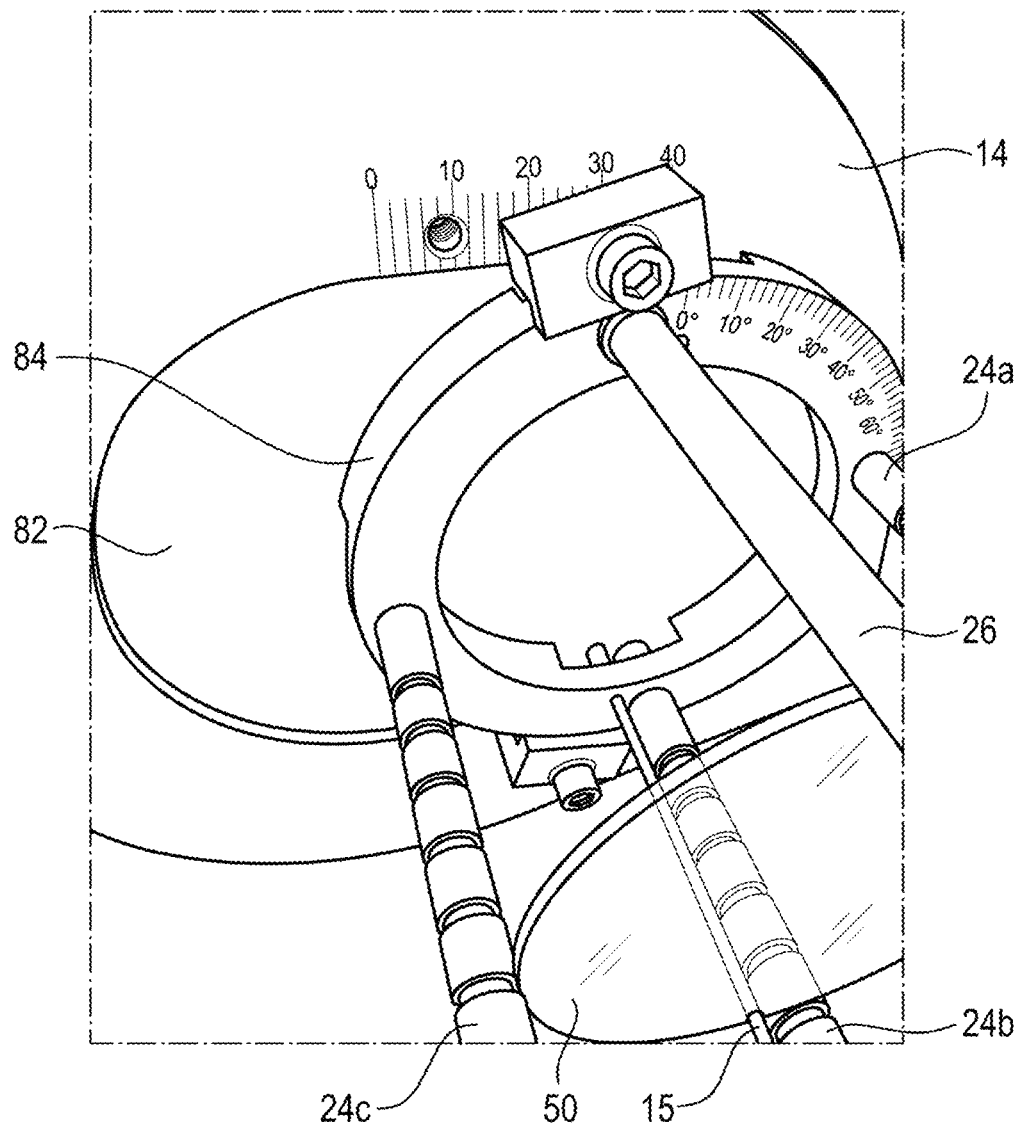
FIG. 10 shows a perspective view on a part of a second embodiment of a lens holder for use in an exemplary embodiment of a tinting device according to an aspect of the present disclosure.

FIG. 10 shows a perspective view on a part of a second exemplary embodiment of a lens holder for use in an exemplary embodiment of a tinting device according to an aspect of the present disclosure. In particular, FIG. 10 shows a reception unit comprising three rods 24a, 24b, 24c and a bar 26, wherein the three rods and the bar are connected to shifting element 84. In this exemplary embodiment, the shifting element 84 comprises a ring. The rods 24a, 24b and 24c comprise notches in which the lens 50 is inserted. The lens 50 is furthermore prevented from falling out of the reception unit by the bar 26. A fixed position is guaranteed by the guiding element 15, being a stick in this exemplary embodiment which extends through a notch on the edge of the lens. The ring is arranged in such a manner that its plane is perpendicular to the rods. In other words, the plane of the ring is configured to be parallel to the lens plane. The shifting element 84 (i.e., the ring) is configured to be inserted into a decentration space 82 of a plate 14 of the lens holder.

In this exemplary embodiment, the shifting element 84 is configured to be shifted in the decentration space 84. In particular, the plate may comprise a scale indicating the amount of shifting (i.e., displacement) from the rotation axis of the lens holder. For example, if a marker on the ring pointed to "0" on the scale, this may indicate that the reception unit is positioned in such a manner that the geometric center of the reception area enclosed by the rods and the bar (and hence the lens) is crossed by the rotation axis of the lens holder. On the other hand, if the marker pointed to "1 for example, this would indicate a decentration by 10 mm, i.e., a shifting of the geometric center of the lens from the rotation axis by 10 mm. Similarly, the reception unit may be rotated in the decentration space 84 around an axis crossing the reception area (and hence the lens). The amount of rotation may be indicated by a scale as well.

The lens holder may further comprise fixing elements, for example screws, configured to fix the shifting element 84 in the decentration space 82 of the lens holder. The decentration space 82 in this exemplary embodiment comprises a recess in the plate 14. However, other kinds of decentration spaces are conceivable. For example, the decentration space could be defined by rails or the like on which the shifting element 84 could be moved.

Figure 11:
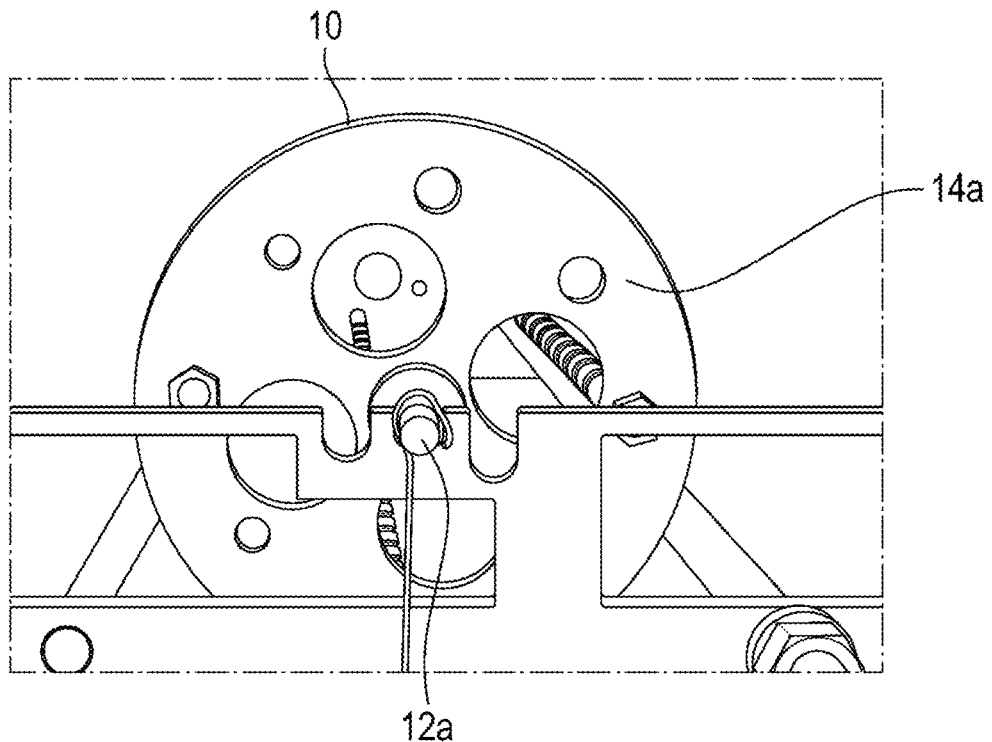
FIG. 11 shows a side view of a first exemplary embodiment of a tinting device.

FIG. 11 shows a side view of a first exemplary embodiment of a second tinting device 100. In fact, only parts of the tinting device 100 can be seen in FIG. 11. In particular, there is shown a plate 14a of the lens holder 10 and the shaft 12a on the plate 14a. The shaft 12a of the lens holder 10 is inserted in a receiving element of the tinting device 100. By this construction, the lens holder 10 can be stably rotated by driving the shafts.

Figure 12:
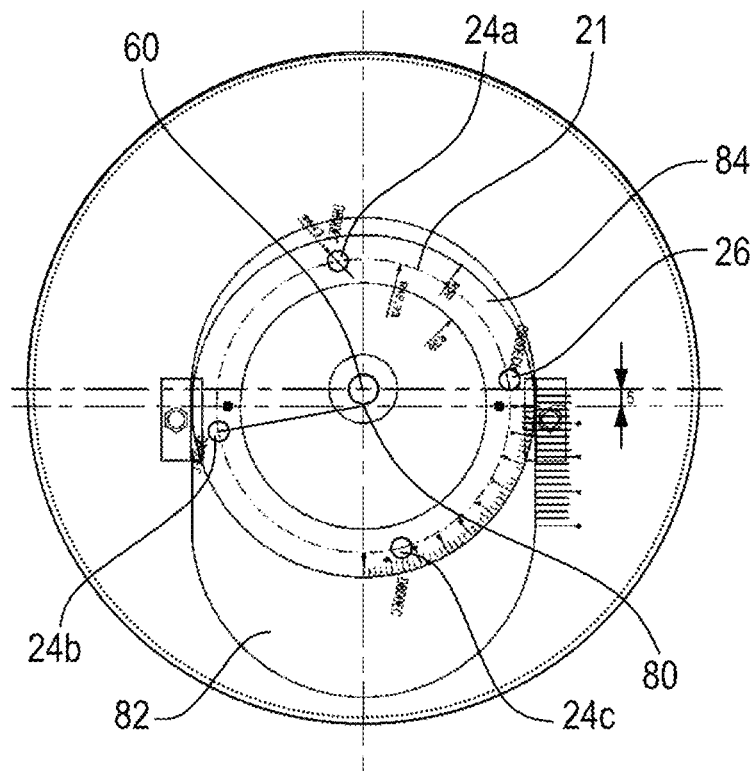
FIG. 12 shows a schematic drawing indicating the displacement of a reception unit with respect to the rotation axis of the lens holder.

FIG. 12 shows a schematic drawing indicating the displacement of a reception unit 20 with respect to the rotation axis of the lens holder. In this figure, the shifting element 84 is represented by a ring and the reception area 21 of the reception unit reflecting the position of the lens 50 is indicated by the circle surrounded by the dashed line. FIG. 12 particularly shows a displacement of the geometric center 80 of the reception area 21 of the lens holder (and hence of the lens) with respect to the rotation axis 60; indicated to amount to 5 mm. In particular, there is shown a space of decentration 82 indicating a space, in which the reception unit 20 can be moved around. As can be seen and as is also indicated by the scale shown, the reception unit 20 and hence the geometric center 80 of the lens can be shifted further away from the rotation axis 60, in particular in such a manner that the rotation axis does not longer cross the reception area of the lens holder, i.e., that the rotation axis is located outside the reception area (namely in a case where the shifted element 84 is shifted to the lowest position possible). However, the reception unit 20 may likewise be shifted back in a position where the geometric center 80 and the rotation axis 60 coincide.

Figure 13:
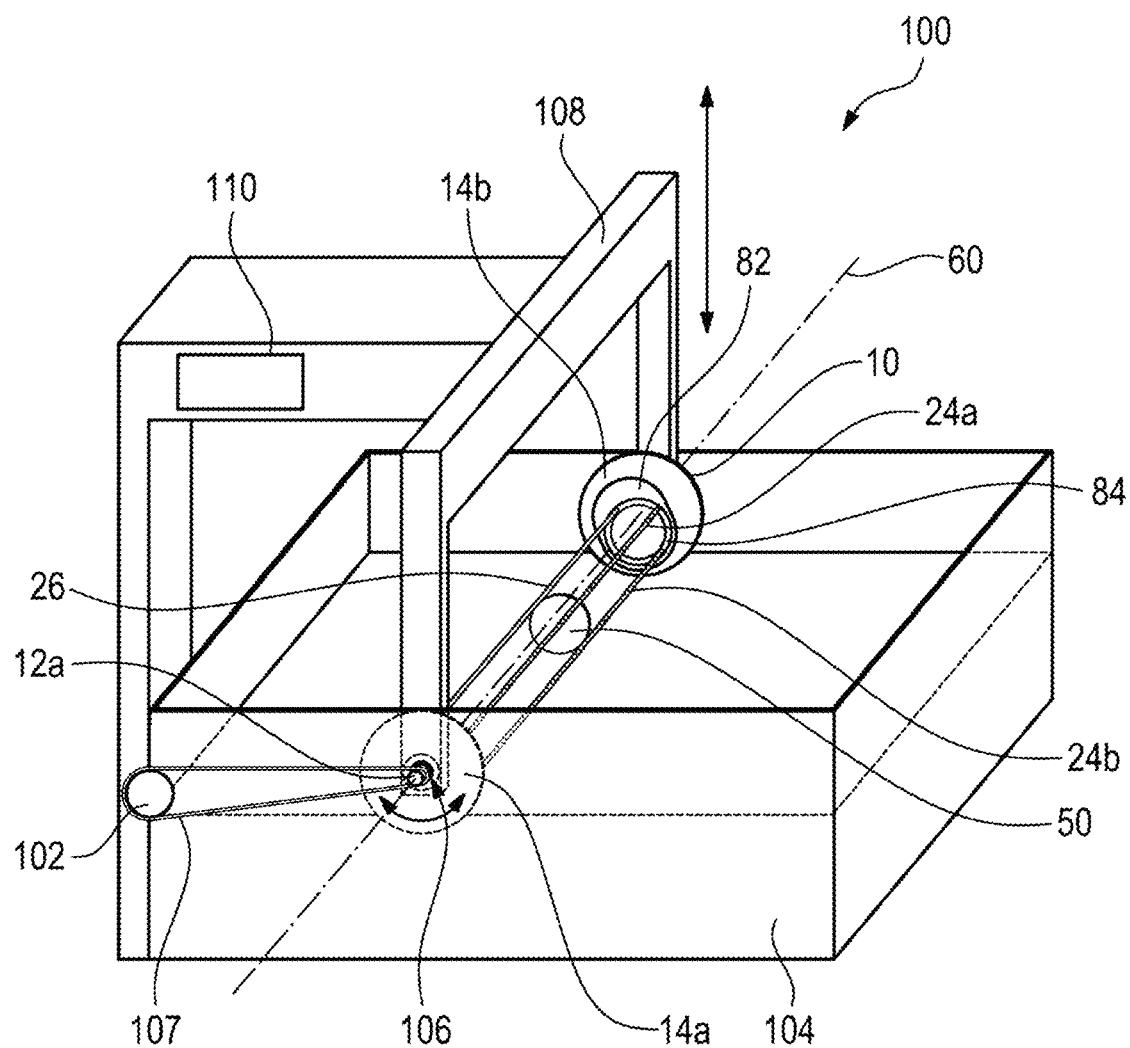
FIG. 13 shows a perspective view of a second embodiment of a tinting device.

FIG. 13 shows a perspective view on another exemplary embodiment of the second tinting device 100 for tinting a lens 50. The tinting device 100 comprises a lens holder 10, an immersion bath 104 and a rotation unit 102. The lens holder 10 comprises two opposing plates 14a and 14b which are connected by rods 24 and a bar 26. In order to hold the lens 50 in a fixed position, the rods comprise notches for receiving the lens and a bar ensuring that the lenses stay fixed in the lens holder. The rods of the lens holder 10 in this exemplary embodiment comprise a plurality of notches allowing a plurality of lenses to be held in the reception area of the lens holder 10. The lens holder 10 further comprises shafts 12a and 12b which are configured to be inserted in receiving elements 106 of the tinting device 100. Accordingly, the lens holder 10 may be rotated around an (imaginary) rotation axis 60 connecting the shafts 12a and 12b. In fact, there is provided a rotation unit 102 in the tinting device 100 comprising a belt drive 107 configured to rotate the shaft 12a and hence the lens holder 10 around the rotation axis 60.

The rods 24 and the bar 26 are connected on their ends to a shifting element 84, which is connected with the plates 14a and 14b, respectively. In particular, the shifting element can be moved in decentration space 82, i.e., a recess, in the plates 14a and 14b, respectively. Accordingly, the reception unit can be shifted along the surface of the plates 14a and 14b with respect to the point where the (imaginary) rotation axis 60 crosses the plates 14a and 14b, respectively.

In the exemplary embodiment shown in FIG. 13 the tinting device 100 further comprises a lifting unit 108 which is configured to move the lens holder 10 in a direction perpendicular to the surface of the immersion bath. The lifting unit 108 may move the lens holder towards the bottom of the immersion bath and/or in reverse direction. Hence, the lifting unit 108 is configured to adjust the depth of immersion in the immersion bath 104. In particular, the lifting unit 108 may move the lens holder 10 while the rotation unit 102 rotates the lens holder 10. In this exemplary embodiment, the lens holder 10 may be rotated around its rotation axis 60 in a first direction to a first maximum angle while being immersed into the immersion bath by the lifting unit 108 to a first depth. Then, the lens holder 10 may be lifted such that it is no longer immersed in the immersion bath. In a next step, the lens holder may be rotated by the rotation unit 102 around its rotation axis 60 in a second direction to a second maximum angle while being immersed into the immersion bath by the lifting unit 108 to a second depth.

By adjusting the depth of immersion of the lenses into the immersion bath 104 and by adjusting the angles of rotation in the two rotation directions a wide variety of individual lens tints can be generated. This applies all the more, if tints are changed during the tinting process, i.e., between tinting cycles, for example by changing the tint's color. Furthermore, instead of using a tint in the immersion bath a decoloring liquid may be used resulting in novel decoloring effects. For example, lenses with a decentered halo tint at a first position and an inverted decentered halo at a second position may be created using the tinting device 100.

In this exemplary embodiment the lifting unit 108 is run by a servo motor 110. Using such a motor guarantees a smooth movement of the lens holder 10 and thus a precise tinting of the lenses.

Figure 14:
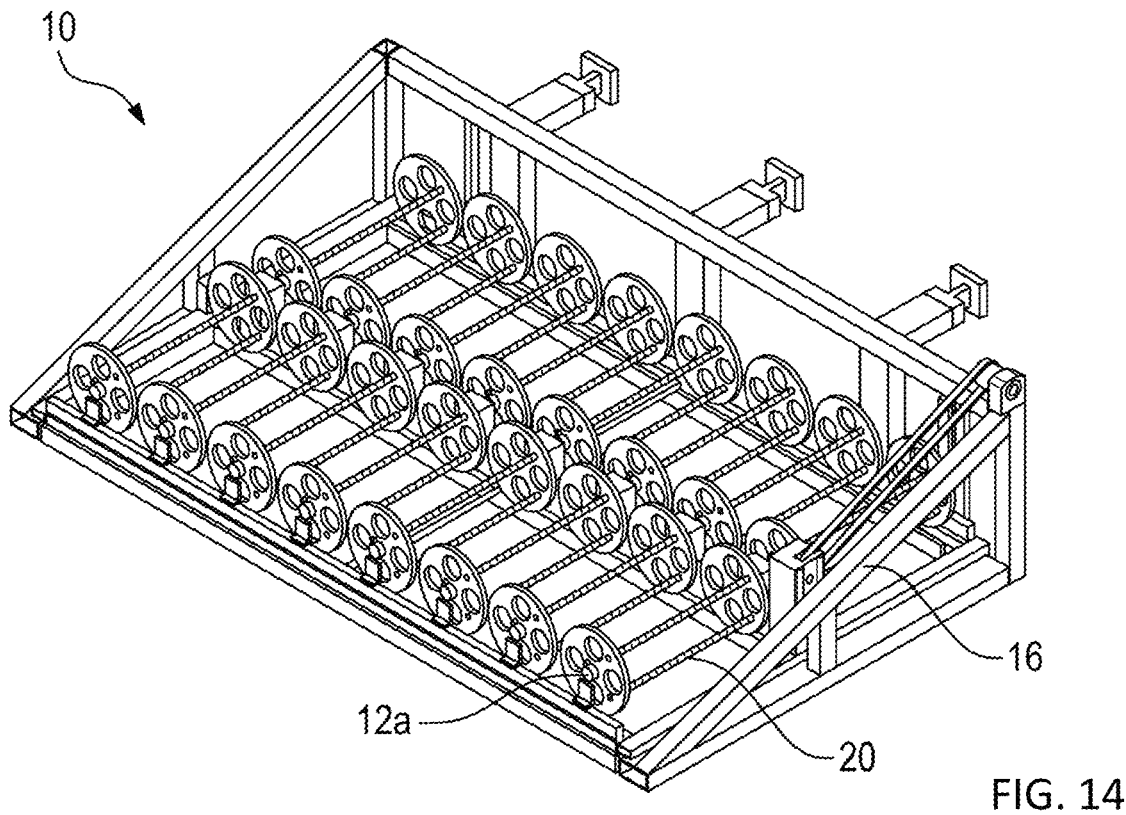
FIG. 14 shows a third exemplary embodiment of a lens holder for use in an exemplary embodiment of a tinting device according to an aspect of the present disclosure.

FIG. 14 shows another exemplary embodiment of a lens holder 10 for use in a tinting device according to an aspect of the present disclosure. In this exemplary embodiment, the lens holder 10 is configured to hold a plurality of lenses 50, in particular more than 160 lenses. The lens holder 10 comprises a rack 16 to be inserted into a tinting device 100. The rack 16 comprises 16 sub-holders arranged in two rows. Each sub-holder comprises two rods comprising notches for receiving and fixing a plurality of lenses 50, particularly more than 10 lenses.

Figure 15:
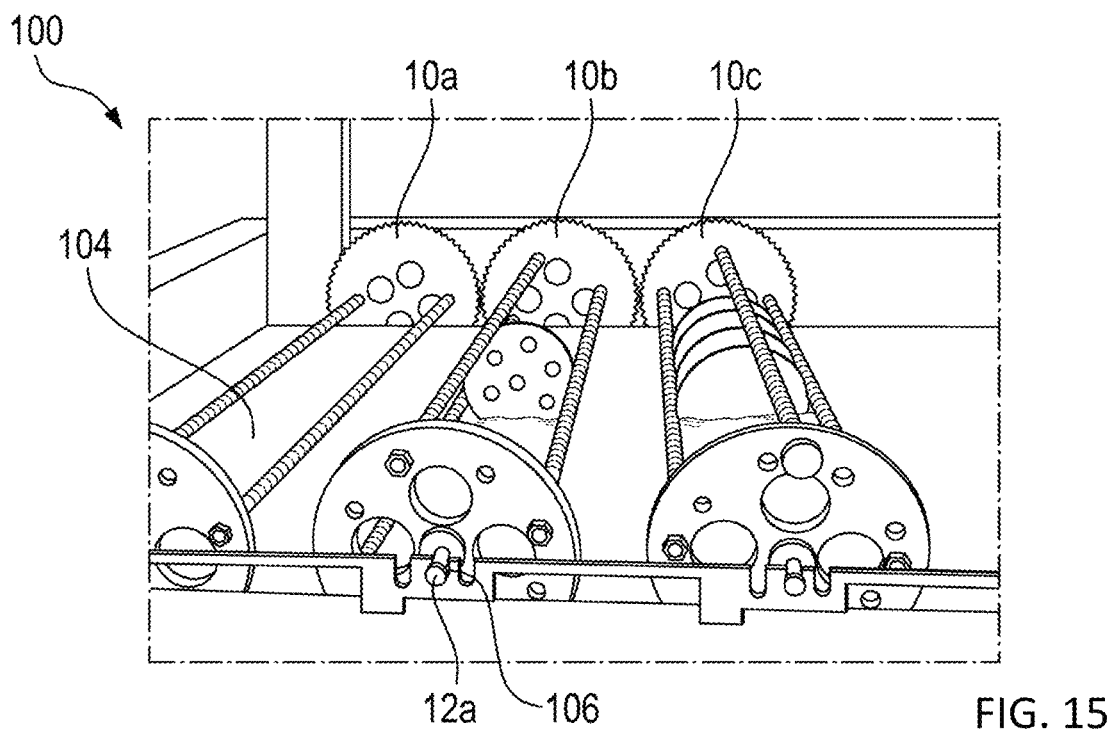
FIG. 15 shows a side view of a third exemplary embodiment of a tinting device according to an aspect of the present disclosure.

FIG. 15 shows a side view of an exemplary embodiment of a tinting device 100 according to an aspect of the present disclosure. The tinting device 100 comprises three lens holders 10a, 10b and 10c being partially immersed in an immersion bath 104 of the tinting device 100. In the lens holder 10c there are inserted a plurality of lenses 50 to be tinted.

Figure 16:
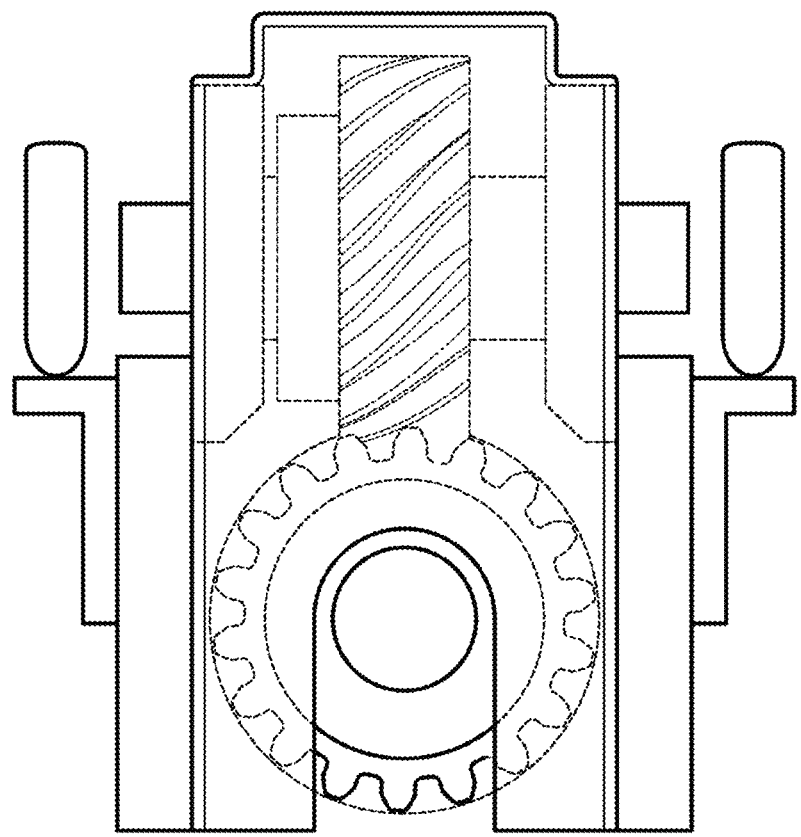
FIG. 16 shows an exemplary gear arrangement for a precisely controlled angular rotation of a lens holder in a tinting device.

FIG. 16 shows an exemplary gear arrangement for a precisely controlled angular rotation of a lens holder in a tinting device. In conventional tinting arrangements, such a precise angular control is not required. The inventors recognized that in particular in the context of the lifting unit 108 being configured to adapt a depth of immersion of the lens holder 10 into the immersion bath 104 according to a rotation angle of the lens holder 10, precise control of the angular rotation can be provided by providing a tinting device comprising a lens holder comprising a gear arrangement adapted to cause a rotation of the lens holder around the rotation axis. In particular, a spur gearing provides accurate control of the angular rotation.

While the disclosure has been illustrated and described in detail in the drawings and foregoing description, such illustration and description are to be considered illustrative or exemplary and not restrictive; the disclosure is not limited to the disclosed exemplary embodiments. Other variations to the disclosed embodiments can be understood and effected by those skilled in the art in practicing the claimed disclosure, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A method for producing a lens having a tint gradient, the method comprising:
   inserting a lens into a reception unit of a lens holder;
   providing an immersion bath containing a fluid;
   immersing the lens holder into the fluid; and
   rotating the lens holder and the lens inserted into the reception unit around a rotation axis to a predetermined maximum rotation angle,
   wherein the rotation axis is located outside the lens and generally perpendicular to a plane of the lens, and
   wherein the rotation axis is a same rotation axis for the lens holder and the lens inserted into the reception unit.

2. The method as claimed in claim 1, wherein the method further comprises displacing the reception unit from the rotation axis.

3. The method as claimed in claim 1, wherein the lens holder is rotated in a first direction to a first position at a first predetermined angle and in a second direction to a second position at a second predetermined angle, wherein the first predetermined angle is different from the second predetermined angle.

4. The method as claimed in claim 3, wherein the lens holder is held in the first position for a first time period and in the second position for a second time period, and wherein the first time period is different from the second time period.

5. The method as claimed in claim 1, wherein immersing the lens holder into the fluid comprises moving the lens holder in a direction perpendicular to a surface of the immersion bath.

6. The method as claimed in claim 1, wherein immersing the lens holder into the fluid comprises immersing the lens holder completely or partially into the immersion bath.

7. The method as claimed in claim 1, wherein the method further comprises adapting a maximum depth of immersion of the lens holder into the immersion bath according to the predetermined maximum rotation angle of the lens holder.

8. The method as claimed in claim 5, wherein the lens holder is moved in the direction perpendicular to the surface of the immersion bath by a servo motor.

9. The method as claimed in claim 1, wherein the lens holder is rotated by a belt drive.

10. The method as claimed in claim 1, wherein the fluid includes a tinting liquid, containing tint configured to tint the lens, or a decoloring liquid configured to decolorize the lens.

11. The method as claimed in claim 1, wherein the method further comprises steps of:
    removing the lens holder from the immersion bath;
    any of changing the fluid, displacing the lens with respect to the rotation axis, or rotating the lens around its own geometric center; and
    immersing the lens holder into a same or another immersion bath.

12. The method as claimed in claim 1, wherein the lens comprises a flat glass, a mono lens or a shield.

13. The method as claimed in claim 1, wherein the lens comprises a polygonal shape.

14. A tinting device for tinting a lens, the tinting device comprising:
    a lens holder containing:
       a reception unit configured to hold a lens in a first plane; and
       a rotation axis generally perpendicular to the first plane,
       wherein the lens holder is configured to rotate around the rotation axis;
    an immersion bath comprising a fluid, wherein the lens holder is configured to be immersed in the fluid; and
    a rotation unit configured to rotate the lens holder and the lens inserted into the reception unit around the rotation axis of the lens holder to a predetermined maximum rotation angle,
    wherein the rotation axis is located outside the lens, and
    wherein the rotation axis is a same rotation axis for the lens holder and the lens inserted into the reception unit.

15. The tinting device as claimed in claim 14, wherein the reception unit is configured to be displaced from the rotation axis in a plane parallel to the first plane.

16. The tinting device as claimed in claim 14, wherein the reception unit comprises a guiding element configured to support a positioning of the lens in the lens holder.

17. The tinting device as claimed in claim 14, wherein the lens holder comprises two opposing plates, wherein the plates are generally parallel to the first plane and wherein the reception unit comprises a connecting element configured to connect the plates.

18. The tinting device claimed in claim 17, wherein the connecting element comprises a recess and/or a protrusion for holding the lens.

19. The tinting device as claimed in claim 14, wherein the reception unit is configured to hold three or more lenses.

20. The tinting device as claimed in claim 14, wherein the rotation unit is configured to rotate the lens holder in a first direction to a first position at a first predetermined angle and in a second direction to a second position at a second predetermined angle, wherein the first predetermined angle is different from the second predetermined angle.

21. The tinting device as claimed in claim 20, wherein the rotation unit is configured to hold the lens holder in the first position for a first time period and in the second position for a second time period, wherein the first time period is different from the second time period.

22. The tinting device as claimed in claim 14, wherein the rotation unit is configured to adapt the predetermined maximum rotation angle of the lens holder according to a depth of immersion of the lens holder into the immersion bath.

23. The tinting device as claimed in claim 14, wherein the rotation unit comprises a belt drive.

24. The tinting device as claimed in claim 14, wherein the tinting device further comprises a lifting unit configured to move the lens holder in a direction perpendicular to the surface of the immersion bath.

25. The tinting device as claimed in claim 24, wherein the lifting unit is configured to immerse the lens holder completely or partially in the immersion bath by moving the lens holder.

26. The tinting device as claimed in claim 25, wherein the lifting unit is configured to be driven by a servo motor.

27. The tinting device as claimed in claim 26, wherein the lifting unit is configured to adapt a maximum depth of immersion of the lens holder into the immersion bath according to the predetermined maximum rotation angle of the lens holder.

28. A non-transitory computer program comprising program code means for causing a computer to control the tinting device as claimed in claim 14 to carry out the steps of the method as claimed in claim 1 when the computer program is carried out on the computer.

29. The method as claimed in claim 1 further comprising:
displacing the reception unit from the rotation axis during immersion.

30. The method as claimed in claim 12, wherein the shield is a helmet shield.

31. The method as claimed in claim 12, wherein the polygonal shape is a triangular or quadrangular shape.

32. The tinting device as claimed in claim 15, wherein the reception unit is configured to be adjustably displaced from the rotation axis in the plane parallel to the first plane.

33. The tinting device as claimed in claim 15, wherein the reception unit is configured to be adjustably displaced from the rotation axis in the plane parallel to the first plane by up to 40 mm.

* * * * *

UNITED STATES PATENT AND TRADEMARK OFFICE
CERTIFICATE OF CORRECTION

| | | |
|---|---|---|
| PATENT NO. | : 12,145,337 B2 | Page 1 of 1 |
| APPLICATION NO. | : 18/477211 | |
| DATED | : November 19, 2024 | |
| INVENTOR(S) | : Davide Terzi, John Feng and Brolin Li | |

It is certified that error appears in the above-identified patent and that said Letters Patent is hereby corrected as shown below:

In the Specification

In Column 10, Line 13: change "cylcle" to --cycle--

In Column 16, Line 8: change "unit" to --unit 20--

In Column 16, Line 13: change "reception" to --reception unit--

In Column 16, Line 25: change "holder" to --holder 10--

Signed and Sealed this
Thirty-first Day of December, 2024

Derrick Brent
*Acting Director of the United States Patent and Trademark Office*